Patented Oct. 16, 1928.

1,688,256

UNITED STATES PATENT OFFICE.

KLAUS WEINAND, OF COLOGNE-FLITTARD, GERMANY, ASSIGNOR TO GRASSELLI DYE-STUFF CORPORATION, OF NEW YORK, N. Y., A CORPORATION OF DELAWARE.

DYESTUFFS OF THE ANTHRAQUINONE SERIES.

No Drawing. Application filed December 23, 1927, Serial No. 242,282, and in Germany December 20, 1926.

The present invention is a further development of the process described and claimed in my application Ser. No. 130,111, filed on August 18, 1926 for the manufacture of dyestuffs of the anthraquinone series and consists in introducing amino groups of cyclic paraffins into the anthraquinone nucleus. The term cyclic paraffins as used herein is meant to cover the products obtained by hydrogenating cyclic compounds other than those of the benzene and naphthalene series, e. g. compounds having five, seven or ten carbon atoms in a ring configuration.

The manufacture of the new dyestuffs is effected by causing an amine of a cyclic paraffin, e. g. pentamethyleneamine, bornylamine to react upon a halogenated anthraquinone sulfonic acid in presence of a copper catalyst.

The new dyestuffs are generally blue crystalline substances, easily soluble in water and dyeing animal fibres exceedingly pure, blue shades, fast to light.

The following examples will illustrate my invention:

*Example 1.*—20 parts by weight of 1-amino-4-bromanthraquinone-2-sulfonic acid, 12 parts by weight of sodium carbonate and 60 parts by weight of pentamethyleneamine are dissolved in 900 parts by weight of water and 100 parts by weight of alcohol with the addition of 1 part by weight of copper sulfate. The whole is boiled under reflux for a period of two hours, whereby the solution assumes a blue coloration. Then the alcohol and the excess of the base are distilled off and the dyestuff is precipitated by means of common salt in the form of a crystalline mass. In its free state it has most probably the formula:

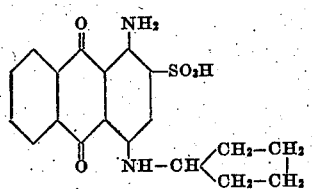

It dissolves in water with a clear blue coloration and dyes wool from an acid bath in very clear, blue shades, which are fast to light.

*Example 2.*—20 parts by weight of 1-amino-4-bromanthraquinone-2-sulfonic acid, 12 parts by weight of sodium carbonate and 60 parts by weight of bornylamine are dissolved in 900 parts by weight of water and 100 parts by weight of alcohol with the addition of 1 part by weight of copper sulfate. The whole is boiled under reflux for a period of two hours, whereby the solution assumes a blue coloration. Then the alcohol and the excess of the base are distilled off and the dyestuff is precipitated by means of common salt in the form of a crystalline mass. In its free state it has most probably the formula:

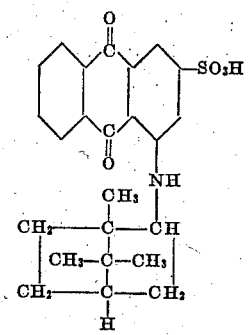

It dissolves in water with a clear blue coloration and dyes wool from an acid bath in very clear, blue shades, which are fast to light.

I claim:

1. As new products amino-anthraquinone compounds in which one hydrogen atom of the amino group is substituted by a cyclic paraffin radicle other than those obtained by hydrogenating compounds of the benzene and naphthalene series.

2. As new products amino-anthraquinone sulfonic acids in which one hydrogen atom of the amino group is substituted by a cyclic paraffin radicle other than those obtained by hydrogenating compounds of the benzene and naphthalene series being water soluble, blue crystalline substances, dyeing animal fibres exceedingly clear, blue shades, fast to light.

3. As new products 1.4-diaminoanthraquinone-2-sulfonic acids which are substituted in the 4-amino-group by a cyclic paraffin radicle other than those obtained by hydrogenating compounds of the benzene and naphthalene series, which are water soluble blue crystalline substances, dyeing animal fibres exceedingly clear, blue shades, fast to light.

4. As a new product 1-amino-4-pentamethyleneamine-anthraquinone-2-sulfonic acid, which crystallizes in blue needles, being soluble in water with a blue coloration, dyeing wool exceedingly pure, blue shades, fast to light and having in a free state most probably the formula:

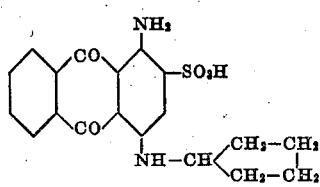

5. The process which comprises reacting in the presence of a copper catalyst with a cyclic paraffin amine other than those obtained by hydrogenating compounds of the benzene and naphthalene series upon a halogen-anthraquinone compound.

6. The process which comprises reacting in the presence of a copper catalyst with a cyclic paraffin amine other than those obtained by hydrogenating compounds of the benzene and naphthalene series upon a sulfonic acid of a halogen anthraquinone compound.

7. The process which comprises reacting in presence of a copper catalyst with an amine of a cyclic paraffin other than those obtained by hydrogenating compounds of the benzene and naphthalene series upon 1-amino-4-bromo-2-anthraquinone sulfonic acid.

8. The process which comprises heating an aqueous solution of 1-amino-4-bromo-anthraquinone-2-sulfonic acid with pentamethyleneamine and copper sulfate.

In testimony whereof I have hereunto set my hand.

KLAUS WEINAND.